United States Patent
Smith et al.

(10) Patent No.: US 12,323,797 B2
(45) Date of Patent: Jun. 3, 2025

(54) SYSTEM AND METHOD OF DISTRIBUTED COMMUNICATIONS

(71) Applicants: DENSO International America, Inc., Southfield, MI (US); DENSO CORPORATION, Kariya (JP)

(72) Inventors: Eric J. Smith, Holland, MI (US); Kyle Cooper, Plainwell, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 489 days.

(21) Appl. No.: 17/709,635

(22) Filed: Mar. 31, 2022

(65) Prior Publication Data

US 2022/0322092 A1    Oct. 6, 2022

Related U.S. Application Data

(60) Provisional application No. 63/168,384, filed on Mar. 31, 2021.

(51) Int. Cl.
*H04W 12/08* (2021.01)

(52) U.S. Cl.
CPC .................................. *H04W 12/08* (2013.01)

(58) Field of Classification Search
CPC ...................................................... H04W 12/08
USPC ......................................................... 455/411
See application file for complete search history.

(56) References Cited

U.S. PATENT DOCUMENTS

| | | | |
|---|---|---|---|
| 8,706,081 B1* | 4/2014 | Paya | H04M 17/103 455/410 |
| 2015/0126109 A1* | 5/2015 | Keshavdas | H04B 5/72 455/41.1 |
| 2016/0065268 A1* | 3/2016 | Dobyns | H04W 48/04 455/41.1 |
| 2021/0028928 A1* | 1/2021 | Hariharan | H04L 63/10 |

* cited by examiner

*Primary Examiner* — Qutbuddin Ghulamali
(74) *Attorney, Agent, or Firm* — Warner Norcross + Judd LLP

(57) ABSTRACT

A system and method to facilitate synchronized operation and/or distributed operation of one or more aspects of a secure element of a first device in a communication system, such as an NFC capable communication system of the device, that communicates with a mobile device (e.g., a portable device or smartphone).

18 Claims, 3 Drawing Sheets

100, 200 OK # SYSTEM AND METHOD OF DISTRIBUTED COMMUNICATIONS

FIELD OF THE INVENTION

The present disclosure relates to a system and method for communicating with a portable device, and more particularly to communication capabilities for a plurality of devices with the portable device.

BACKGROUND

Portable devices, also described as mobile devices, have become increasingly prevalent in communications across a wide spectrum of applications. For instance, a portable device may communicate with a real-time locating system, potentially disposed on an object, such as a vehicle or a building, in order to facilitate determining location of the portable device with respect to the object.

Additionally, or alternatively, the portable device may establish communications to provide, receive, or exchange information in a secure manner. For instance, the portable device may include communication circuitry capable of communicating according to a near field communication (NFC) standard. Conventionally, an NFC enabled device may communicate with the portable device to exchange data, such as transaction information or payment information. The NFC enabled device may be in the form of an NFC reader capable of obtaining information from the portable device via communications according to the NFC standard. The portable device and/or the NFC reader, in conventional systems, may include a secure element (SE) that includes an applet (an application or program with read and/or writable data capabilities) that communicates with another NFC capable device (e.g., another portable device or another NFC reader). The applet may take the form of an electronic wallet that stores a secure payment token to implement a financial transaction in which a physical credit card or debit card associated with the secure payment token is not physically present. In other words, the applet may emulate aspects of the physical card so that the portable device and/or the NFC reader can be used without physical presence of the physical card. Additionally, rather than being a fixed medium, the applet may be adapted to incorporate additional payment tokens or to update software (e.g., to fix a security vulnerability).

SUMMARY

A system and method are provided to facilitate synchronized operation and/or distributed operation of one or more aspects of a secure element of a first device in a communication system, such as an NFC capable communication system of the device, that communicates with a mobile device (e.g., a portable device or smartphone).

In one embodiment, a near field communication (NFC) system is provided with a first device and a second device. The first device may include a secure element (SE) stored as secure element data in the first device. The first device may also include a first device controller communicatively coupled to the secure element, and configured to communicate secure element information pertaining to the secure element. The secure element information may include at least one of a) a data packet generated by or provided to the secure element and b) at least a portion of the secure element data of the secure element.

The second device may be remote from and communicatively coupled to the first device. The second device may include a second device controller configured to communicate the secure element information with respect to the first device controller, and operable to provide a second device secure element interface based on the secure element information. The second device secure element interface may be a remote interface to the secure element of the first device.

In one embodiment, the second device may include a second device NFC antenna configured to transmit NFC communications to a mobile device and to receive NFC communications from the mobile device. The second device may also include a second device NFC controller communicatively coupled to the second device NFC antenna, where the second device NFC controller is operable to communicate with the second device secure element interface. The second device NFC controller may be configured to receive, from the mobile device, a mobile device data packet for the second device secure element interface. The remote data packet may correspond to communications transmitted via a communication link between the second device and the mobile device.

In one embodiment, the secure element information received by the second device controller is a distributed version of a secure element applet of the secure element, where the second device secure element interface is the distributed version of the secure element applet of the secure element.

In one embodiment, after the mobile device interacts with the distributed version of the secure element applet via the second device secure element interface, the second device controller may provide secure element information to the first device controller and pertaining to a state change with respect to the secure element relating to interactions between the mobile device and the second device secure element interface.

In one embodiment, the secure element information is at least one of received by the second device controller and transmitted to the first controller, and where the secure element information pertains to the data packet generated by or provided to the secure element, wherein the second device secure element interface relays the mobile device data packet.

In one embodiment, a method is provided for communicating via near field communication (NFC). The method may include communicating secure element information pertaining to a secure element (SE) of a first device, where the secure element information includes at least one of a) a data packet generated by or provided to the secure element and b) at least a portion of secure element data of the secure element. The method may include communicating, in a second device, the secure element information with the first device, and providing, in the second device that is remote from the first device, a second device secure element interface that is based on the secure element information communicated with the first device.

In one embodiment, the method may include transmitting NFC communications from the second device to a mobile device, and receiving, in the second device, NFC communications transmitted from the mobile device that includes a mobile device data packet for the second device secure element interface.

In one embodiment, the method may include obtaining a lock with respect to the secure element of the first device, operating the second device secure element interface as the secure element of the first device, and substantially preventing a third device secure element interface of a third device from operating as the secure element of the first device until after the lock is released.

In one embodiment, the method may include the second device receiving the secure element information in accordance with a distributed version of a secure element applet of the secure element, and providing the second device secure element interface conducting NFC communications in accordance with the distributed version of the secure element applet of the secure element.

In one embodiment, the method may include communicating, in the second device, the secure element information with the first device includes relaying the mobile device data packet to the secure element of the first device.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION

Figure 1:
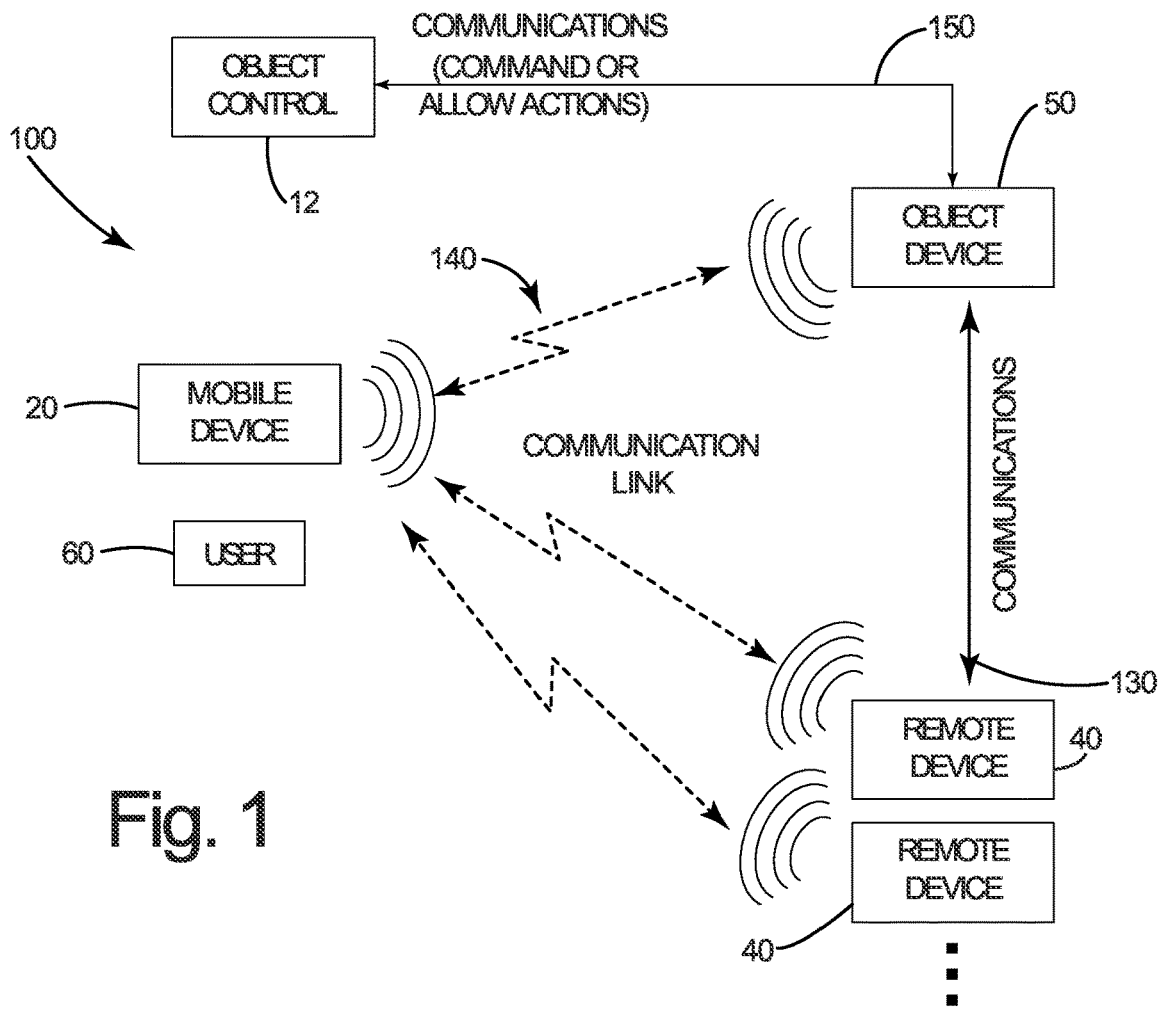
FIG. 1 shows a representative view of a system in accordance with one embodiment.

A system and method according to one embodiment are provided to facilitate synchronized operation and/or distributed operation of one or more aspects of a secure element of a first device in a communication system, such as an NFC capable communication system of the first device, that communicates with a mobile device (e.g., a portable device or smartphone). In one embodiment, the first device may share the secure element, or aspects thereof, with one or more remote devices, enabling each of the one or more remote devices to communicate with the mobile device according to the shared portion of the secure element in place of the first device. Additionally, or alternatively, the first device and the one or more remote devices may be operable to communicate information pertaining to the secure element via a communication link to enable a remote device to communicate according to an aspect of the secure element without all or a portion of the aspect being provided on the remote device. For instance, the remote device may relay communications from the mobile device to the first device for processing by the secure element of the first device, and a response from the secure element may be communicated back to the remote device for transmission to the mobile device.

In one embodiment, the first device may share the secure element, or aspects thereof, with one or more remote devices. Additionally, or alternatively, the first device may share the secure element, or aspects thereof, with a second remote device, and that second device may share the secure element, or aspects thereof, with a third remote device. Communications may occur in reverse as well, with the third remote device sharing information to the second remote device, which then shares information with the first device.

A system and method according to one embodiment of the present disclosure may allow a mobile device to communicate with a secure element of the first device without communicating directly with the first device. In one embodiment, the mobile device may be capable of communicating wirelessly in accordance with a communication standard that allows for communication over relatively short distances, including, for example, the NFC standard (e.g., less than 10 cm or less than 20 cm). Multiple remote devices may be disposed distal from the first device at a distance that is greater than the effective communication distance of the communication standard (e.g., a distance greater than 10 cm or 20 cm in the case of NFC). Each of the remote devices may be operable to communicate with the mobile device in accordance with the communication standard and in accordance with one or more aspects of the secure element stored in the first device. This way, the remote devices may increase the effective distance of communications according to the communication standard, and allow the mobile device to communicate according to the communication standard over larger areas. In a practical example, the remote devices may be disposed in a plurality of locations on an object (e.g., a vehicle), and an NFC capable mobile device may communicate with any one of the remote devices according to an aspect of the secure element of the first device. Each of the remote devices may be indistinguishable from each other with respect to the secure element, or an aspect thereof. If the mobile device or the secure element, or both, is configured to pair with the other of the mobile device or the secure element (such as by securely storing information pertaining to the other of the mobile device or the secure element) pairing with each of the remote devices may be avoided. In other words, each of the remote devices may operate in accordance with the pairing so that additional paring for each remote device can be avoided.

In one embodiment, the system and method according to one embodiment may facilitate content distribution of a secure element from a first device to one or more remote devices. The secure element may be synchronized among the first device and the one or more remote devices via a communication link. A mobile device may pair with one of the first device and the one or more remote devices, and synchronization or content distribution among the first device and the one or more remote device may enable the mobile device to communicate with any one of the first device and the one or more remote devices as if that device were substantially the same as any other of the first device and the one or more remote devices with respect to the paired communication. The mobile device may not need to pair with each of the first device and the one or more remote devices.

The communication link between the first device and the one or more remote devices may be a low bandwidth link in one embodiment, such that the bandwidth of the communication link is incapable of effectively relaying communications to and from a remote device and the first device to present the remote device as having the secure element of the first device. Using the communication link, one or more aspects of the secure element of the first device may be communicated to the one or more remote devices (e.g., when possible, such as before communicating with the mobile device) and stored in memory of the one or more remote devices. Communications relating to the secure element, such as communications that occur before communications with the mobile device, pertain to content distribution and/or synchronization among the first device and the one or more remote devices.

In one embodiment, changes to one or more data items, data, or information associated with a secure element may be synchronized with the first device and the one or more remote devices via a communication link between the first device and the one or more remote devices. The changes may be synchronized periodically or in response to an event, such as in response to an item change, data change, or information change, or any combination thereof. For instance, as discussed herein in further detail, if memory associated with the secure element is modified or updated in one device in response to providing temporary access to an object associated with the device and relative to the mobile device, the changes to memory may be distributed to one or more other devices via the communication link so that any one of the first device and the one or more remote devices may be capable of authenticating access to the object in response to communicating with the mobile device.

In one embodiment, the secure element or an aspect thereof may be communicated from the first device to one or more remote devices and provided on the one or more remote devices. With multiple copies of the secure element or an aspect thereof being provided in multiple locations, a failure of any one device may be recoverable by replacement of the failed device and providing a copy of the lost data to the new device.

In one embodiment, memory associated with the secure element may be distributed over a plurality of devices, such as across the first device and a remote device, such that at least a portion of the memory is stored in one device but not another. This way, in cases where the memory requirements of the secure element are large relative to the available space on any one device, the effective memory of the secure element can be increased.

In one embodiment, content distribution and/or synchronization of one or more aspects of a secure element may be conducted in a manner that provides distributed operation of one or more applets of the secure element without affecting operation of one or more applets of the secure element or being perceptible to the one or more applets. This way, an applet provided for the system may be generated independent of or without awareness of the content distribution and/or synchronization functionality provided in accordance with one embodiment of the present disclosure. An applet in one embodiment may be configured to facilitate content distribution and/or synchronization in accordance with one or more embodiments described herein. The applet configured in this way may or may not be privileged. Such an applet may be considered a dedicated applet.

Although one or more embodiments according to the present disclosure may involve synchronization of a secure element, or aspects thereof, across multiple devices, it is to be understood that the present disclosure is not so limited. In one embodiment, the system may include multiple devices each including a secure element or a distributed form thereof. Because there are multiple secure elements in the system, potentially disposed at different locations, the system may provide one or more of reduced latency, additional storage, and additional compute capacity. Such a system may provide an enhanced user experience.

It is noted that synchronization and/or content distribution in one or more embodiments according to the present disclosure may include one or more versions and/or signatures of summaries of the data in a secure element that is communicated. In this way, the system may determine which secure elements to update. Optionally, the system may determine a course of action for updating the secure elements, or an aspect thereof.

In one embodiment, memory associated with a secure element may be distributed over multiple devices, such that memory associated with a secure element applet of said secure element is decentralized. This decentralization may be managed by a synchronization protocol that is at least one of distributed, decentralized, and synchronized. Data may be distributed in any manner. For instance, data may be centralized to one secure element and/or data may be copied in multiple secure elements. Additionally, or alternatively, a decentralized protocol may be utilized to synchronize and/or distribute data across a network.

I. System Overview

Figure 2:
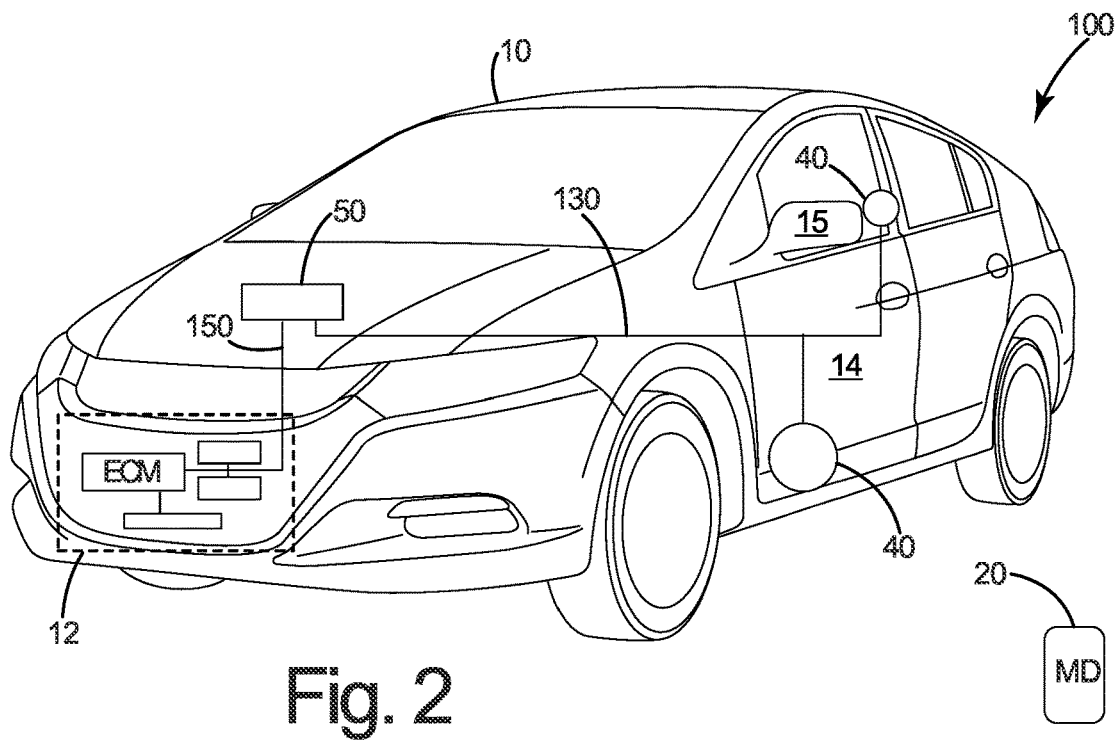
FIG. 2 shows a representative view of the system of FIG. 1 in accordance with one embodiment.

A system in accordance with one embodiment is shown in the illustrated embodiment of FIGS. 1 and 2 and generally designated 100. The system 100 may include one or more system components as outlined herein. A system component may be a user 60, an object device 50, or remote device 40 shown in the illustrated embodiments of FIGS. 3 and 4. The system component also may be a mobile device 20 or another electronic component including one or more aspects of the example devices. The underlying components of the system component, as discussed herein, may be configured to operate in conjunction with any one or more system components. In this sense, in one embodiment, there may be several aspects or features common among the mobile device 20, the remote device 40, and the object device 50, as well as other components of the system 100 described herein.

For instance, one or more features described in connection with the object device 50 depicted in FIG. 3 may form part of a mobile device 20 or the remote device 40, or any combination thereof. Conversely, one or more features described in conjunction with the mobile device 20 or the remote device 40 may form part of the object device 50. Additionally, or alternatively, it is to be understood that any feature described in conjunction with any of the object device 50, mobile device 20, remote device 40, and any system component, may be absent in one or more embodiments. In one embodiment, the object device 50 or a component of a control system of an object 10 may include the same or similar components described in conjunction with a system component, and may form a component disposed on the object 10, such as a vehicle or a building.

An object device 50 in the form of a system component may be communicatively coupled to one or more systems of the object 10, collectively forming an object control system to control operation of the object 10. Information may be communicated among system components of the object control system, such as by being transmitted and received between two or more components of the object 10.

As mentioned herein, the object 10 including the object device 50 may include communication capabilities. The object 10 may include one or more communication networks 150, wired or wireless, that facilitate such communication, such as a wired bus shown in the illustrated embodiment of FIG. 1. The communication network 150 may also enable one or more system components, internal or external to the object control system, to communicate with the object control system. For instance, the communication network 150 may facilitate communication between the object control system (including one more system components as described herein) and the object device 50. Such a communication network 150 may be a CAN bus and is shown as a vehicle bus in the illustrated embodiment of FIG. 2. Additionally, or alternatively, the object control system may facilitate communication directly or indirectly among system components. For instance, the object control system in the illustrated embodiment of FIG. 1 is configured to communicate and enable direct communication between the object device 50 and an object control 12, embodied to include an engine control module (ECM).

In one embodiment, the object 10 may include a telematics control unit (TCU), which is not shown. For instance, the TCU may be connected to the object control system via the communication network 150 or another type of communication link, such as an SPI link. In another embodiment, the TCU may be combined with the object control system, such as being part of the object control 12. The TCU may be absent in one embodiment and data that would have been provided by the TCU may be tunneled through the mobile device 20 (e.g., via BTLE). "Tunneled" may be defined as a traditional tunnel—like running TCP/IP over BTLE; however, the present disclosure is not so limited. The tunnel may be defined as a configuration that enables relevant data to be communicated to the object control system or other system components via commands/responses.

In one embodiment, the TCU may include a cellular modem or other long range WAN radio (Lora, Sigfox, etc.).

In one embodiment, as described above, the TCU is not a required part of the system; for instance, all functionality of the TCU and the system it communicates with may be performed locally (e.g., not in the cloud).

In the illustrated embodiment of FIGS. 1 and 2, the object 10 is provided with an object device 50 and a plurality of remote devices 40 disposed at positions relative to the object 10. For instance, in the context of the vehicle shown in FIG. 2, the remote devices 40 are disposed inside or near the vehicle door 14, inside or near the vehicle rearview mirror 15, or a variety of other locations of the vehicle. Example locations are also described in U.S. Pat. No. 10,356,550 to Smith et al., entitled METHOD AND SYSTEM FOR ESTABLISHING MICROLOCATION ZONES, filed Dec. 14, 2017, issued Jul. 16, 2019, and U.S. Pat. No. 10,362,461 to Stitt et al., entitled SYSTEM AND METHOD FOR MICROLOCATION SENSOR COMMUNICATION, filed Dec. 22, 2017, issued Jul. 23, 2019—the disclosures of which are hereby incorporated by reference in their entirety.

The remote devices 40 in one embodiment may be sensors or monitor devices capable of detecting communications with respect to the mobile device 20 and another system component, such as the object device 50 or another remote device 40. In one embodiment, the remote devices 40 may communicate sensed information (e.g., signal strength, time of flight, angle of arrival) pertaining to communications detected with respect to the mobile device 20. For instance, the remote device 40 may communicate sensed information via a communication link 130 to another device, such as the object device 50, connected to the communication link 130. The object device 50 may be operable to determine a location of the mobile device 20 based on the sensed information. Examples of such a determination are also described in U.S. Pat. No. 10,356,550 to Smith et al., entitled METHOD AND SYSTEM FOR ESTABLISHING MICROLOCATION ZONES, filed Dec. 14, 2017, issued Jul. 16, 2019, and U.S. Pat. No. 10,362,461 to Stitt et al., entitled SYSTEM AND METHOD FOR MICROLOCATION SENSOR COMMUNICATION, filed Dec. 22, 2017, issued Jul. 23, 2019—the disclosures of which are hereby incorporated by reference in their entirety.

Based on the determined location of the mobile device 20 relative to the object 10, the object device 50 may transmit a command or instruction to the object control 12 to enable a capability of the object 10, such as to mobilize the object 10 in the case of a vehicle, or to enable access to a location related to the object 10. The object device 50 in one embodiment may include a locator capable of receiving sensor information pertaining to wireless communications with the mobile device 20 (e.g., Bluetooth Low Energy (BTLE) and/or Ultra Wide Band (UWB) communications), including one or more signal characteristics of the communications, such as signal strength (e.g., RSSI), Angle of Arrival, and Time of Flight. In one embodiment, as described herein, the object device 50 may include a secure element controller 220 capable of facilitating communications with a secure element 230 of the object device 50. The secure element 230 may vary from application to application. For example, the secure element 230 provides secure storage and processing capability with any of the following configurations: a) a separate module/IC from a host (application) module, with its own storage and execution software (operating system and applets), b) a separate module/IC from a host (application) module, with its own storage, but with its execution software (operating system and applets and/or application software) in the host module, c) an isolated integrated module of a host (application) module, with its own storage and execution software (operating system and applets), d) an isolated integrated module of a host (application) module, with its own storage, but with its execution software (operating system and applets and/or application software) in the host module, e) an integrated component of a host (application) module software, with its storage isolated from other host (application) components via software or hardware mechanisms (with its execution software [operating system and applets and/or application software] operating as an isolated or integrated component of the host module (application) software). In other words, the secure element 230 may be a separate module (SE), an integrated module (HSM), or part of the software with secured storage, or a different configuration depending on the application.

The secure element 230 may include a container [e.g., a processor] and memory, and the memory may store the OS (e.g., JCOP or something else) of the secure element 230. Running within the OS are Applets (applications) and data (application data). The secure element 230 may include both RAM and ROM. The secure element 230 may include an attached host processor; however, the secure element 230 may not require such a separate host processor, and thus the secure element 230 may be the only processor of the device. For instance, a first device and a second device may be connected via some network (e.g., CAN, ethernet) and the processing of that network may occur within an applet in the secure element 230 or as part of the operating system software of the secure element 230.

In one embodiment, a secure element 230 may derive data as part of communications with a portable device that needs to be distributed. For instance, an SE applet 232 may compute a key, and this key may be shared/distributed to other SEs in the system 100.

In the illustrated embodiment, the secure element 230 includes memory separate from the memory 212. However, the present disclosure is not so limited. For instance, the memory of the secure element 230 may correspond to the memory 212 of the object device 50, such that the secure element 230 shares memory 212 of the object device 50.

As described herein, the object device 50 and a remote device 40 may include NFC capabilities. The NFC may be coupled indirectly or directed to the secure element 230 of the object device 50. The NFC may be coupled indirectly or directed to a component of the remote device 40 pertaining to the secure element 230 (e.g., a distributed version of the secure element 230).

Communications with the secure element 230 may be conducted by one or more of the remote devices 40 in a distributed or shared manner as described herein, such that secure element information is transmitted from the object device 50 to the remote device 40 via the communication link 130. The communication link 130 may be a wired connection or wireless connection, or a combination thereof. As an example, the communication link 130 may be established via a BTLE connection, or the communication link 130 may be established via a CAN bus.

The mobile device 20 in the illustrated embodiment may be capable of communicating via a communication link 140 with one or more of the remote devices 40 and the object device 50 according to a communication standard. The communication link 140 in the illustrated embodiment is an NFC communication link, but the present disclosure is not so limited.

The communication link 140 in one embodiment is not limited to a single type of communication link or establishment of a single communication link at a given time between the mobile device 20 and a system component of the object 10. For instance, the mobile device 20 may establish a first communication link 140 with a first remote device 40 according to the NFC standard, and may simultaneously establish a second communication link 140 with the object device 50 according to the BTLE standard. As another example, the mobile device 20 may establish a first communication link 140 with a first remote device 40 at one time according to the NFC standard, and establish a second communication link 140 with a second remote device 40 at another time according to the NFC standard or according to the BTLE standard.

In the illustrated embodiment, the communication link 140 is shown optionally present, in phantom lines, between the mobile device 20 and each of the object device 50 and the plurality of remote devices 40. It is noted that, as discussed herein, one or more of these communication links 140 may be established at any given time, and that multiple communication links 140 may be established simultaneously or concurrently (with the same device or separate devices).

As discussed herein, the object device 50 may include a secure element controller 220 capable of facilitating communication with respect to a secure element 230 in a distributed or shared manner across more than one device. Such communication may be achieved via one or more of the communication links 140, such that an effective range for communications in accordance with an aspect of the secure element 230 may be increased. Additionally, or alternatively, the communication via one or more of the communication links 140 via a plurality of devices (e.g., two or more of the object device 50 and the plurality of remote devices 40) may enhance the robustness of available communication between the mobile device 20 and an aspect of the secure element 230.

II. Object Device

Figure 3:
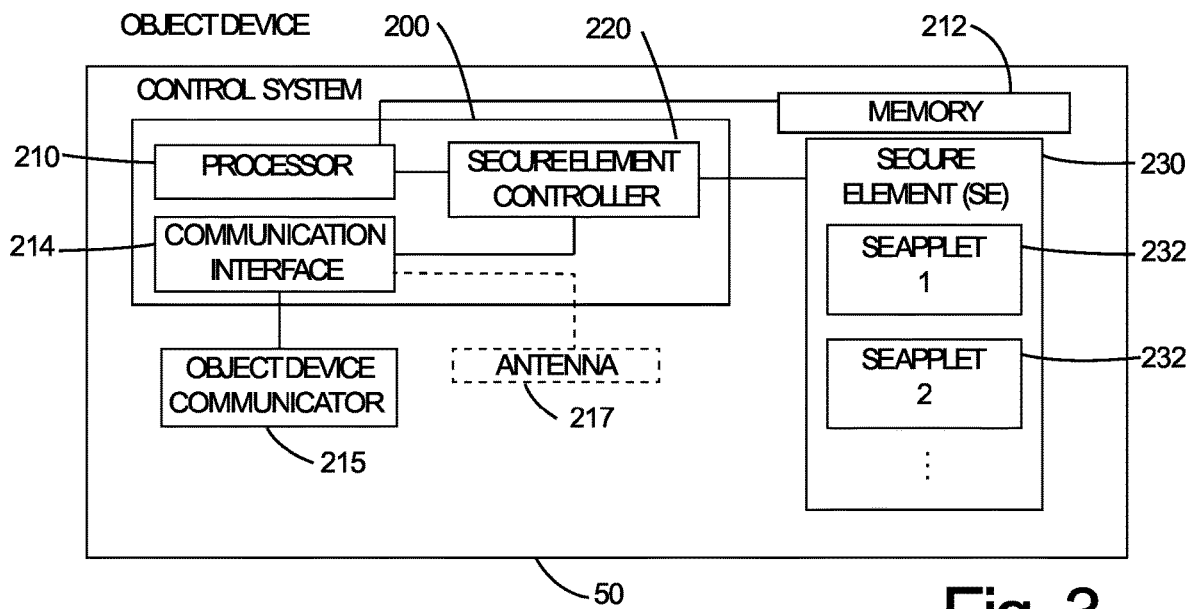
FIG. 3 shows a representative view of aspects of an object device in accordance with one embodiment.

The object device 50 in accordance with one embodiment is shown in FIG. 3. The object device 50 may include a control system 200. The control system 200 of the object device may include one or more processors 210 that execute one or more applications (software and/or firmware), one or more communication interfaces 214, and a secure element controller 220 operable to facilitate communication with respect to a secure element 230 of the object device 50. In one embodiment, the secure element controller 220 may be an NFC controller operably coupled to the communication interface 214. The object device 50, as described herein, may include memory 212 (e.g., RAM and/or ROM), which may be internal or external to the control system 200— although it is shown external to the control system 200 in the illustrated embodiment. It is noted that the present disclosure is not limited to use of NFC in conjunction with the secure element 230. For instance, instead of an NFC controller, the secure element 230 may operate in conjunction with any wired or wireless technology, including a BLE or UWB controller, or an application processor not connected to radios.

In the illustrated embodiment, the communication interface 214 may be optionally coupled to one or more antennas 217 (e.g., an NFC antenna). As described herein, although the object device 50 includes the secure element 230 for NFC communications, the object device 50 may not necessarily be capable of communicating wirelessly with an NFC capable device—e.g., the mobile device 20. Rather, in one embodiment, the object device 50 may communicate secure element information with one or more remote devices 40, which may be capable of communicating wirelessly with an NFC capable device in accordance with the NFC standard. Alternatively, the object device 50 may include an NFC antenna, and the secure element controller 220 may communicate with the mobile device 20 in accordance with the NFC standard.

The control system 200 of the object device 50 may include an operating system that controls access to lower level electronics of the control system 200 via the communication interface 214, which may operate as an interface between one or more components of the control system 200 or between one or more components of the control system 200 and one or more components of the object device 50 external to the control system 200. For instance, the operating system may facilitate transmission and reception of communications to an object device communicator 215, which may be configured to facilitate communication with one or more remote devices 40 disposed on the object 10. The object device communicator 215 may be operable to establish the communication link 130 between the object device 50 and one or more of the remote devices 40. It is to be understood that the object device communicator 215 is not necessarily an auxiliary communicator or secondary communicator, and may form the primary communication circuitry for establishing external communications with respect to the object device 50. In one embodiment, the object device communicator 215 may facilitate establishing the communication link 130 as well as exchanging communications via the communication network 150. For instance, the communication link 130 and the communication network 150 may share a physical medium or transmission of communications signals, and the object device communicator 215 may be operable to generate and process such communications signals.

In one embodiment, the secure element controller 220 may be operable to communicate directly with one or more components coupled to the communication interface 214, such as an antenna 217 or the object device communicator 215, or both. A secure element controller 220, for instance, may bypass an operating system of the control system 200 to allow direct interface between a secure element applet 232 of the secure element 230 and a component coupled to the communication interface 214, such as an antenna 217 or the object device communicator 215, or both.

The object device communicator 215 may provide any type of communication link, including any of the types of communication links describe herein, including wired or wireless. The communication interface 214 may facilitate communication in conjunction with the object device communicator 215 that is external or internal, or both. As an example, the communication interface 214 in conjunction with the object device communicator 215 may provide a wireless communication link with another system component in the form of the remote device 40, such as wireless communications according to the BTLE standard, or an external server component (e.g., the cloud) via a Wi-Fi Ethernet communication link. In another example, the communication interface 214 in conjunction with the object device communicator 215 may be configured to communicate with an object component (e.g., a vehicle component) via a wired link such as a CAN-based wired network that facilitates communication between a plurality of devices. The control system 200 in one embodiment may include a display and/or input interface coupled to the communication interface 214 for communicating information to and/or receiving information from the user 60.

The object device 50, and one embodiment, may be configured to communicate with one or more auxiliary devices (not shown) other than a system component or a user 60. The auxiliary device may be configured differently from a system component, such as by not including a processor and instead including at least one direct connection and/or a communication interface for transmission or receipt, or both, of information with the object device 50. For instance, the auxiliary device may be a solenoid that accepts an input from the object device 50, or the auxiliary device may be a sensor (e.g., a proximity sensor) that provides analog/and or digital feedback to the object device 50.

The secure element 230, in the illustrated embodiment, is shown separate from memory 212; however, one or more aspects of the secure element 230 may be stored in memory 212, which may be tamper-resistant memory for security sensitive applications, such as the secure element 230 and one or more secure element applets 232 provided in the secure element 230. The secure element 230 in the illustrated embodiment is the secure element controller 220, which may facilitate communications with the secure element 230 in accordance with one or more embodiments herein, including communications with one or more remote devices 40 to enable distributed and/or shared use of the secure elements 230 by devices other than the object device 50. The secure element controller 220, in one embodiment, may include an NFC communication controller that handles communications to and from the secure element 230 in conjunction with NFC related communications with the mobile device 20 and the object device 50 or a remote device 40.

The secure element 230 may be operable to generate data packets and to receive data packets from a secure element controller 220. The secure element controller 220 may receive and/or transmit such data packets as secure element information or part of secure element information communicated via the communication interface 214.

The secure element 230, as described herein, may include one or more secure element applets 232, also described as an applet 232. An applet 232 may be an application or type of software configured to enable a particular task or set of instructions. The applet 232 may include an interface with one or more readable and/or writable memory portions to facilitate performance of the task or set of instructions. The memory portions may or may not be provided in the memory 212. The applet 232 may form a closed or managed software application separate from user accessible aspects of the object device 50. In other words, the applet 232 may perform the task or set of instructions separate from other aspects of the control system 200 such that the modifications to the control system 200 are potentially incapable of modifying instructions or accessing memory associated with the applet 232 without doing so through an application program interface of the applet 232. This way, an applet 232 can be considered a controlled set of instructions to enable a particular task in a secure manner. Updates or modifications to the applet 232 may be conducted via an application program interface of the applet 232 and/or the secure element 230. For instance, the secure element 230 may allow removal or installation of an applet 232 within memory space of the secure element 230. Likewise, the secure element 230 may allow modifications or updates to the applet 232 if authorization to do so is established.

Examples of applets 232 include an electronic wallet capable of facilitating financial services or payment processing without a physical card (e.g., without a credit card or debit card). Additional examples of applets 232 include a credential store capable of facilitating authentication and/or authorization with respect to one or more actions, commands, or instructions of the object 10.

An applet 232 may be operable to communicate with an external device, such as a point-of-sale terminal. Alternatively, the applet 232 may form the point-of-sale terminal for communicating with a corresponding applet of a mobile device 20.

The secure element 230, as discussed herein, may be configured to store information in memory 212. Such information may be stored by the applet 232 or another aspect of the secure element 230. Example types of information include credentials, authorization information, and authentication information used for facilitating secure communications requesting an action in a secure manner. For instance, the information may be authenticating a mobile device 20 and determining the mobile device 20 (e.g., or a user 60 of the mobile device 20) is authorized with respect to a command or action pertaining to the object 10. In one embodiment, the applet 232 may facilitate authenticating and authorizing a request from the mobile device 20 to unlock a vehicle door 14. Additionally, or alternatively, the vehicle door 14 may be unlocked in conjunction with a location determination with respect to the mobile device 20. For instance, the object device 50 may determine that the location of the mobile device 20 is within a zone relative to the vehicle door 14 that is associated with unlocking or enabling the vehicle door 14 to be unlocked, and the secure element 230 may communicate with the mobile device 20 in order to determine whether the mobile device 20 is authenticated and/or authorized to enable the vehicle door 14 to be unlocked.

III. Remote Device

Figure 4:
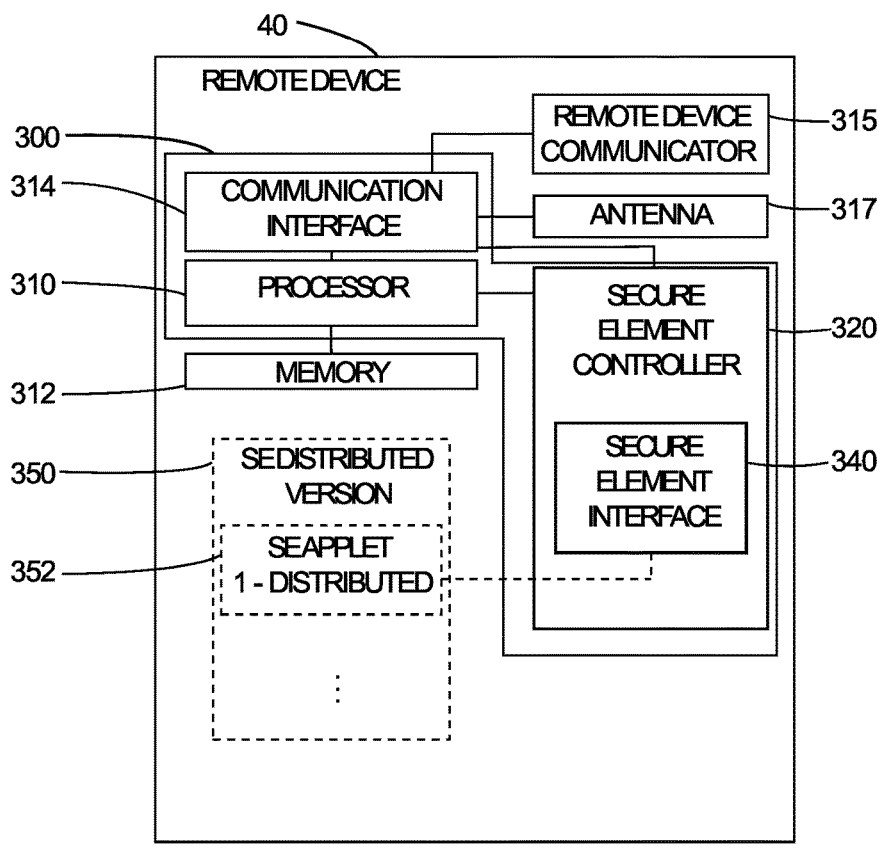
FIG. 4 shows a representative view of aspects of a remote device in accordance with one embodiment.

The remote device 40 in accordance with one embodiment is shown in FIG. 4. The remote device 40 may include a control system 300, which may be similar to the control system 200 of the object device 50 in several respects. For instance, the control system 300 of the remote device 40 may include one or more processors 310 that execute one or more applications (software and/or firmware), one or more communication interfaces 314, and a secure element controller 320.

The secure element controller 320 of the remote device 40 may facilitate communication with respect to the secure element 230 of the object device 50. In one embodiment, the secure element controller 320 may be an NFC controller operably coupled to the communication interface 314. The remote device 40, as described herein, may include memory 312 (e.g., RAM and/or ROM), which may be internal or external to the control system 300—although it is shown external to the control system 300 in the illustrated embodiment.

In the illustrated embodiment, the communication interface 314 may be coupled to one or more antennas 317 (e.g., an NFC antenna). The remote device 40, via the communication interface 314 and the antenna 317, may establish a communication link 130 with the mobile device 20. The communication link 130 may be established according to the NFC standard.

The remote device 40 in the illustrated embodiment may include a remote device communicator 315 similar to the object device communicator 215, and capable of facilitating establishment of the communication link 130 with the object device 50 in conjunction with the communication interface 314 of the remote device 40. The secure element controller 320 of the remote device 40 may directly interact with the communication interface 314, similar to the communication interface 214 and secure element controller 220 of the object device 50.

In the illustrated embodiment, the secure element controller 320 may include a secure element interface 340, which, as described herein, may form a remote or distributed interface with respect to the secure element 230.

In one embodiment, the secure element interface 340 of the secure element controller 320 may be operable as a pass-through or relay for communications established between the mobile device 20 and the remote device 40. Information communicated to and from the secure element 340 of the secure element controller 320 and the secure element controller 220 of the object device 50 may be considered secure element information. In other words, communications from the mobile device 20 directed to the secure element controller 320 may be transmitted to the secure element controller 220 via the communication link 130 or processing by the secure element 230. Communications from the secure element 230 of the object device 50 may be transmitted to the secure element controller 320 of the remote device 40 and passed on to the mobile device 20 via the communication link 140. The communications in this example may be in accordance with the NFC standard; but it is to be understood the present disclosure is not so limited. The communications may be established in accordance with an additional or alternative standard.

The secure element interface 340 in one embodiment, by operating as a pass-through for communications directed to the secure element 230 of the object device 50, may enable the remote device 40 to operably communicate with the mobile device 20 as if the remote device 40 included a local version of the secure element 230 of the object device 50 despite the secure element 230 being stored in the object device 50.

In one embodiment, as described herein, the system 100 may include a plurality of remote devices 40, each including a secure element interface 340. The mobile device 20 may establish a communication link 140 with any one of the remote devices 40 and communicate with the secure element 230 of the object device 50 via the secure element interface 340 of the remote device 40. The mobile device 20 may be unaware that the secure element 230 is physically located at a remote location relative to the remote device 40. The communication link 140 between the mobile device 20 and the remote device 40 may be in accordance with the NFC standard, which may allow for communications over a short range, such as less than 20 or 10 cm. The remote device 40 may be disposed at a distance much greater than the short range relative to the object device 50, allowing the mobile device 20 to communicate with the secure element 230 over a range greater than the short range associated with the communication link 140.

In one embodiment, the distance over which the communication link 140 may be extended to communicate with the secure element 230 of the object device 50 may be limited by the communication capabilities of the communication link 130 between the remote device 40 and the object device 50.

It is to be understood that the communication link 130 between the remote device 40 and the object device 50 may include sufficient bandwidth to support pass-through or relaying of communications directed to and generated from the secure element 230 of the object device 50 with respect to communications between the mobile device 20 and the remote device 40 via the communication link 140. For instance, the bandwidth of the communication link 130 may be greater than or equal to the bandwidth of the communication link 140 in order to avoid performance degradation with respect to the communication link 140 and communications with the secure element 230 of the object device 50.

In the case where a plurality of remote devices 40 are present, the system 100 may be capable of facilitating communications with the secure element 230 of the object device 50 over an effective range or distance much greater than would be otherwise possible with communication capabilities limited to direct communication between the object device 50 and the mobile device 20. For instance, in the case of a vehicle as the object 10 and the communication link 140 being an NFC type of communication link, the remote devices 40 may be disposed at various locations on the vehicle to enable NFC communications with the secure element 230 over an effective range much greater than NFC supports. The mobile device 20 may communicate with the secure element 230 via a remote device 40 at several locations on the vehicle.

With a remote device 40 configured in accordance with one embodiment, the mobile device 20 may communicate with the remote device 40 without needing to specifically pair with the remote device 40 for use with a secure element or secure element applet of the mobile device 20. The mobile device 20 may pair with the secure element 230 of the object device 50, and communicate with the secure element 230 via any one of the remote devices 40.

In one embodiment, the secure element interface 340 of the remote device 40 may be operable to obtain a distributed version of the secure element 230 (or an aspect thereof) of the object device 50 via the communication link 140 with the object device 50. For instance, the secure element interface 340 may obtain a copy of the secure element 230 or a copy of one or more of the applets 232 of the secure element 230. The distributed version of the secure element 230 or an aspect thereof may be stored in memory 312 of the remote device 40, and is shown in phantom lines as a secure element distributed version 350 and a secure element distributed applet 352.

In the illustrated embodiment, the secure element distributed version 350 may be substantially similar to the secure element 230 of the object device 50. The secure element interface 340 may be operable to synchronize or push changes in the secure element distributed version 350 to the object device 50 so that the secure element 230 is up-to-date with respect to such changes. Conversely, the secure element controller 220 may be operable to push changes in the secure element 230 to the secure element controller 320 of the remote device 40 so that the secure element distributed version 350 is up-to-date.

In one embodiment, the secure element interface 340 may communicate with the secure element controller 220 to obtain a lock with respect to the secure element 230. The secure element interface 340 may communicate with the mobile device 20 in conjunction with the secure element distributed version 350, and any changes thereto may be pushed or synchronized to the secure element 230 in an atomic or serialized manner. The lock may prevent operations on the secure element 230 that relate to operations being conducted by the secure element interface 340. It is to be understood that a lock may not be used in cases where memory locations associated with the secure element 230 and the secure element distributed version 350 are not changed in response to communications between the mobile device 20 of the remote device 40 via the communication link 140. In this way, the secure element interface 340 may conduct atomic operations with respect to the secure element 230 while interfacing with the secure element distributed version 350.

With a distributed form of the secure element 230, the remote device 40 may communicate with the mobile device 20 in accordance with the secure element 230 without directly communicating with the secure element 230 of the object device 50. As discussed herein, changes pertaining to the secure element 230 that are generated by the remote device 40 may be transmitted as secure element information by the secure element controller 322 and the secure element controller 220 of the object device 50. This way, the remote device 40 may facilitate synchronizing such changes with the secure element 230 of the object device 50.

In one embodiment, the bandwidth of the communication link 140 between the object device 50 and the remote device 40 may be insufficient to facilitate pass-through or relaying of information between the secure element controller 320 and the secure element controller 220 of the object device 50 in real-time to facilitate communications with the mobile device 20. For instance, the bandwidth of an NFC communication link between the mobile device 20 and the secure element controller 320 may be greater than the available bandwidth for the communication link 140 between the remote device 40 and the object device 50. To avoid such bandwidth limitations, the secure element distributed version 350 may be utilized by the secure element interface 340 and present the mobile device 20 with an interface substantially identical to the secure element 230 or an aspect thereof in a manner that is substantially undetectable to the mobile device 20. The mobile device 20 in this configuration may not need to pair with a secure element of each remote device 40, and instead may be presented with a substantially unified interface in the form of the secure element 230 via the plurality of remote devices 40 and the object device 50.

In one embodiment, with distributed versions of the secure element 230 being provided on one or more remote devices 40, and with the one or more remote devices 40 being separate from the object device 50, the system 100 may provide a failure recovery mode in case of a memory failure or device failure (e.g., failure of an object device 50 or a remote device 40). For instance, if the object device 50 fails or a number or memory becomes corrupt, a new object device 50 may be installed to replace the defective object device 50. The secure element controller 220 and/or the secure element controller 320 may communicate with each other to synchronize with an up-to-date secure element 230.

In one embodiment, the secure element interface 340 may store portions of the secure elements 230 of the object device 50 in the memory 312 of the remote device 40. The portions stored in the memory 312 of the remote device 40 may be absent from the memory of another device, such as the memory 312 of another remote device and/or the memory 212 of the object device 50. As a result, memory associated with the secure element 230 may be distributed across more than one device in the system 100. The secure element controller 320 and the secure element 230 may be operable to obtain memory not present in a respective device via the communication link 130 if such memory is or becomes required in accordance with communications with a mobile device 20 via the communication link 140. In one embodiment, distributing memory associated with the secure element 230 across multiple devices in the system 100 may enable the system 100 to increase an effective amount of memory associated with the secure element 230.

IV. Method of Operation

Figure 5:
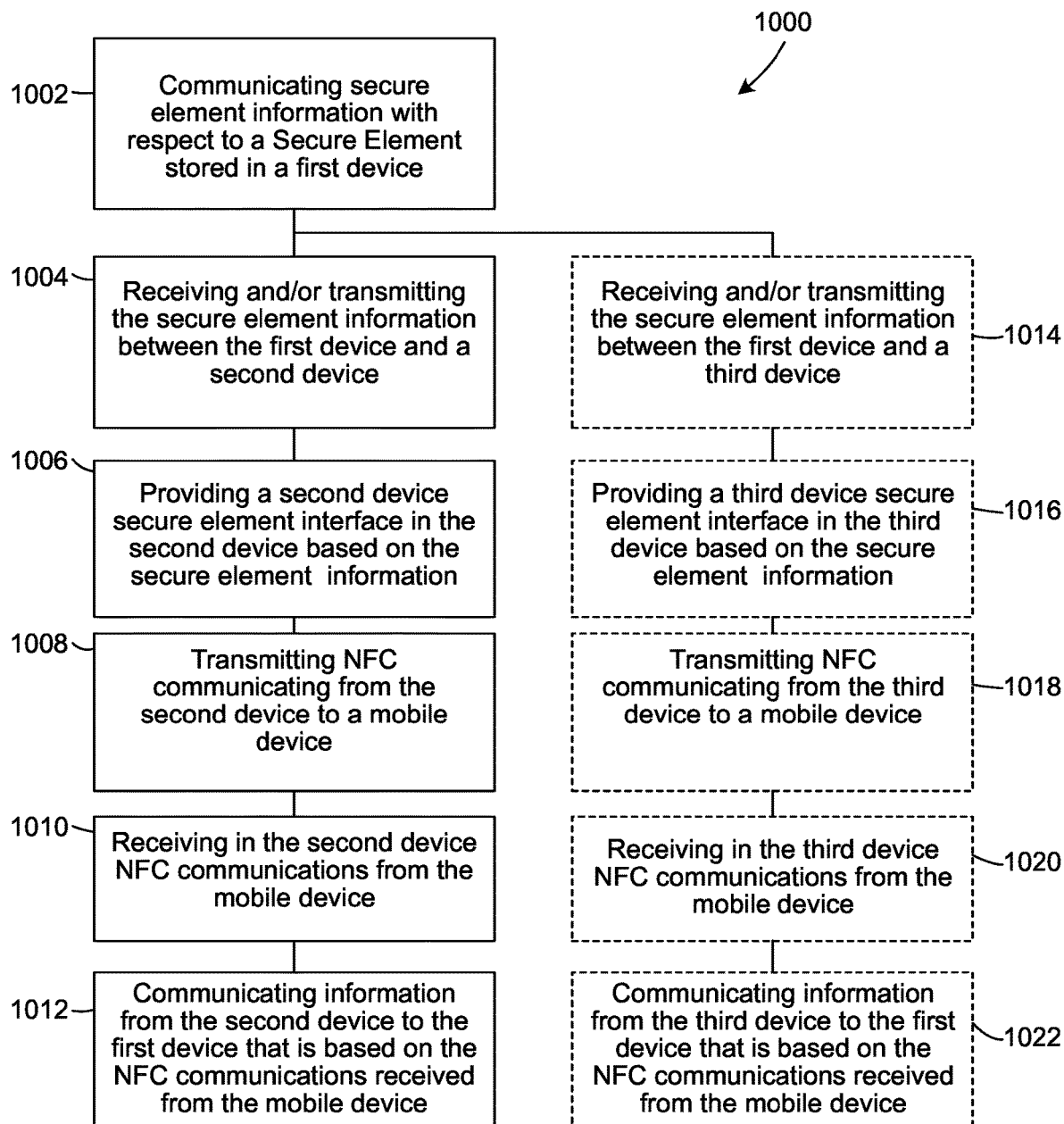
FIG. 5 shows a method of operation in accordance with one embodiment.

A method of operation in accordance with one embodiment according to the present disclosure is depicted in FIG. 5 and generally designated 1000. The method may include communicating secure element information with respect to a secure element 230 stored in a first device, such as an object device 50. Step 1002. The secure element information may correspond to a secure applet 232 of the secure element 230, or the secure element information may correspond to information directed to or transmitted from the secure applet 232 of the secure element 230.

A second device, such as a remote device 40, may receive or transmit, or both, the secure element information with respect to the first device. Step 1004. For instance, as described herein, the second device may receive a distributed version of the secure applet 232 of the secure element, or the second device may receive information generated from the secure applet 232 stored in the first device. The second device may provide a second device secure element interface based on the secure element information received from the first device. Step 1006.

The second device secure element interface, in one embodiment, may correspond to a distributed version of the secure applet 232 of the secure elements 230. The second device may obtain a lock with respect to the secure applet 232 in order to prevent read operations with respect to the secure applet 232 stored in the first device. While the lock is present, read operations may be permitted for the secure applet 232 stored in the first device, including read operations with respect to distributed versions of the secure applet 232 provided on devices other than the first and second devices.

The second device secure element interface may facilitate NFC communications with a mobile device separate from and movable with respect to the first and second devices. Steps 1008, 1010. The second device secure element interface may also facilitate transmitting information to the first device that is based on the NFC communications received from the mobile device. Step 1012.

In one embodiment, with the second device secure element interface providing a distributed version of the secure applet 232, NFC communications with the mobile device may be substantially identical to NFC communications that would otherwise occur with respect to the secure applet 232 stored in the first device. In this way, the second device secure element interface may enable NFC communications in accordance with the secure applet 232, despite the second device being remote from the first device at a distance for which NFC communications may not be possible between the first device and the mobile device. This arrangement may effectively increase an effective range of NFC communications between a system of devices, including first and second devices, and the mobile device.

The second device secure element interface, in one embodiment, may facilitate relaying information between the secure element 230 stored in the first device and a mobile device. For instance, NFC communications received from the mobile device and directed to the secure elements 230 may be relayed from the second device to the first device via a communication link separate from the NFC communications between the mobile device and the second device. Information from the secure element 230 of the first device may be received by the second device, and the second device secure element interface may generate NFC communications based on this information received from the first device.

For purposes of disclosure, the method 1000 is described in conjunction with first and second devices. It is to be understood, however, that additional devices may interact with the first device and a manner similar to the second device. A method of operating a third device in this manner is depicted in the illustrated embodiment in phantom lines, with steps 1014, 1016, 1018, 1020, 1022 corresponding respectively to steps 1004, 1006, 1008, 1010, and 1012.

Directional terms, such as vertical, horizontal, top, bottom, upper, lower, inner, inwardly, outer and outwardly, are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles a, an, the or said, is not to be construed as limiting the element to the singular. Any reference to claim elements as at least one of X, Y and Z is meant to include any one of X, Y or Z individually, and any combination of X, Y and Z, for example, X, Y, Z; X, Y; X, Z; and Y, Z.

The invention claimed is:

1. A communication system comprising:
    a first device including:
        a secure element (SE) including secure element data;
        a first device controller communicatively coupled to said secure element, said first device controller configured to communicate secure element information pertaining to said secure element, said secure element information including at least one of a) a data packet generated by or provided to said secure element and b) at least a portion of said secure element data of said secure element;
    a second device being remote from said first device, said second device communicatively coupled to said first device, said second device including:
        a second device controller configured to communicate said secure element information with said first device controller, said second device controller operable to provide a second device secure element interface based on said secure element information, said second device secure element interface being a remote interface to said secure element of said first device;
        a second device antenna configured to transmit communications to a mobile device and to receive communications from the mobile device;
        said second device controller configured to receive, from the mobile device, a mobile device data packet for said second device secure element interface;
    a third device being remote from said first and second devices, said third device communicatively coupled to said first device, said third device including:
        a third device controller configured to communicate said secure element information with said first device controller, said third device controller operable to provide a third device secure element interface based on said secure element information, said third device secure element interface being a remote interface to said secure element of said first device;
        a third device antenna configured to transmit and receive communications from the mobile device; and
        said third device controller configured to receive, from the mobile device, a mobile device data packet for said third device secure element interface.

2. The system of claim 1 wherein said second device controller is operable to obtain a lock with respect to said secure element of said first device, wherein said second device secure element interface is operable as said secure element of said first device, and wherein said third device secure element interface is substantially prevented via said lock from operating as said secure element of said first device until after said second device controller releases said lock.

3. The system of claim 2 wherein said lock is obtained with respect to a secure element applet of said secure element, such that another secure element applet of said secure element remains unlocked relative to said lock.

4. The system of claim 1 wherein said secure element information received by said second device controller is a distributed version of a secure element applet of said secure element, wherein said second device secure element interface is said distributed version of said secure element applet of said secure element.

5. The system of claim 4 wherein, after or while the mobile device interacts with said distributed version of said secure element applet via said second device secure element interface, said second device controller provides secure element information, to said first device controller, pertaining to a state change with respect to said secure element relating to interactions between the mobile device and said second device secure element interface.

6. The system of claim 1 wherein said secure element information is at least one of received by said second device controller and transmitted to said first device controller, wherein said secure element information pertains to said data packet generated by or provided to said secure element, wherein said second device secure element interface relays the mobile device data packet to said secure element via said first and second device controllers to operate as said secure element.

7. The system of claim 1 wherein said first device includes:
a first device antenna configured to transmit communications to the mobile device and to receive communications from the mobile device; and
said first device controller configured to receive, from the mobile device, a mobile device data packet for said secure element.

8. The system of claim 1 wherein said first device controller is operable to provide a distributed interface to content of said secure element.

9. The system of claim 1 wherein said first device controller and said second device controller are operable to establish a secure communication connection, wherein said secure element information is transmitted via said secure communication connection.

10. The system of claim 1 wherein said second device includes a distributed version of said secure element, and wherein said distributed version of said secure element forms said second device secure element interface, and wherein said distributed version provides a copy of said secure element of said first device.

11. The system of claim 1 wherein memory associated with said secure element is distributed over multiple devices, such that memory associated with a secure element applet of said secure element is decentralized.

12. A method of communicating, the method comprising:
communicating secure element information pertaining to a secure element (SE) of a first device, wherein the secure element information includes at least one of a) a data packet generated by or provided to the secure element and b) at least a portion of secure element data of the secure element;
communicating, in a second device, the secure element information with the first device;
providing, in the second device that is remote from the first device, a second device secure element interface that is based on the secure element information communicated with the first device;
transmitting communications between the second device and a mobile device;
receiving, in the second device, communications transmitted from the mobile device that includes information for the second device secure element interface;
communicating, in a third device, the secure element information with the first device;
providing, in the third device that is remote from the first device, a third device secure element interface that is based on the secure element information communicated with the first device;
transmitting communications between the third device and the mobile device; and
receiving, in the third device, communications transmitted from the mobile device that includes information for the third device secure element interface.

13. The method of claim 12 comprising:
obtaining a lock with respect to the secure element of the first device;
operating the second device secure element interface as the secure element of the first device; and
substantially preventing the third device secure element interface of the third device from operating as the secure element of the first device until after the lock is released.

14. The method of claim 12 wherein:
communicating the secure element information in the second device with the first device includes the second device receiving the secure element information in accordance with a distributed version of a secure element applet of the secure element; and
conducting, via the second device secure element interface, communications in accordance with the distributed version of the secure element applet of the secure element.

15. The method of claim 14 comprising, after or while the mobile device interacts with the distributed version of the secure element applet via the second device secure element interface, providing secure element information, to the first device, that pertains to a state change with respect to the secure element, wherein the state change is based on interactions between the mobile device and the second device secure element interface.

16. The method of claim 14 comprising distributing memory associated with the secure element applet of the secure element to multiple devices to provide a decentralized form of the secure element applet.

17. The method of claim 12, wherein commutating, in the second device, the secure element information with the first device includes relaying the data packet to the secure element of the first device.

18. The method of claim 17 wherein communicating, in the second device, the secure element information with the first device includes relaying communications from the secure element of the first device to the mobile device.

* * * * *

UNITED STATES PATENT AND TRADEMARK OFFICE
CERTIFICATE OF CORRECTION

| | | |
|---|---|---|
| PATENT NO. | : 12,323,797 B2 | Page 1 of 1 |
| APPLICATION NO. | : 17/709635 | |
| DATED | : June 3, 2025 | |
| INVENTOR(S) | : Eric J. Smith et al. | |

It is certified that error appears in the above-identified patent and that said Letters Patent is hereby corrected as shown below:

In the Claims

Column 20, Claim 17, Line 56:
"17. The method of claim 12, wherein commutating, in the"
Should be:
-- 17. The method of claim 12, wherein communicating, in the --

Signed and Sealed this
Thirtieth Day of September, 2025

John A. Squires
*Director of the United States Patent and Trademark Office*